Patented Jan. 22, 1952

2,583,326

UNITED STATES PATENT OFFICE 2,583,326

POLYMERIC COMPOSITIONS FROM ACRYLONITRILE, ITACONIC MONOESTERS, AND CONJUGATED DIENES

Gaetano F. D'Alelio, Pittsburgh, Pa., assignor to Koppers Company, Inc., a corporation of Delaware No Drawing. Application January 6, 1949, Serial No. 69,622

22 Claims. (Cl. 260—78.5)

This invention relates to new copolymers of acrylonitrile. More specifically, it is related to the polymerization products of polymerizable masses comprising acrylonitrile, a conjugated diene and a monoester of itaconic acid polymerized in the presence or absence of other monoethylenic copolymerizable compounds. This invention also deals with compositions of these copolymers adapted to the formation of shaped articles, in many cases to molecularly oriented shaped articles, particularly to fibers, threads, bristles, monofilaments, etc., hereinafter referred to as fibers, and other shaped articles such as films and the like, which articles show improved dyeing.

It has been known for some time that certain copolymers of acrylonitrile may be adapted to the preparation of shaped articles, such as films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions or dispersions of dyes. It has been proposed that improvement in dye susceptibility can be obtained by the use of itaconic acid in small amounts as a copolymerizing monomer in the preparation of acrylonitrile polymers. However, the polymer products obtained thereby have a tendency to crosslink upon standing at temperatures of at least about 70–80° C. or upon spinning from hot solutions. Such crosslinking causes spoilation of material by gelation during storage, embrittlement of fibers, fouling of spinning jets, and other production difficulties.

Very often, however, it is desirable that a certain amount of crosslinking be effected in the acrylonitrile copolymers after they have been formed into shaped articles, either before or after cold-drawing. Moreover, it is also desirable sometimes to impart to shaped articles of these copolymers a certain degree of elasticity. Both of these effects are accomplished by the presence of conjugated dienes in the copolymers.

It has now been found that undesirable and premature crosslinking may be minimized, that improvements in dyeing properties, that delayed and controllable crosslinking and a degree of elasticity in acrylonitrile polymers may be effected by a process of preparing acrylonitrile copolymers in which a monoester of itaconic acid is used as a copolymerizing reagent in a polymerizable composition comprising monomeric acrylonitrile and a diene having the formula

wherein R' is a radical selected from the class consisting of hydrogen and methyl radicals. The polymerizable composition may contain any number of other copolymerizable ethylenic compounds.

Itaconic monoesters used in the practice of the present invention have the formula

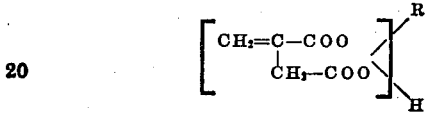

wherein R is an alkyl, aryl, alkylaryl, aralkyl, cyclo-aliphatic group, or halogen-, acyloxy-, or alkoxy-substituted derivative thereof, and wherein the R group may be substituted on either of the acid groups. In general, the formula embraces itaconic monoesters of an esterifiable monohydroxy compound. Illustrative examples of radicals represented by R in the above formula are: methyl, ethyl, propyl, isopropyl, butyl, isobutyl, secondary-butyl, tertiary-butyl, amyl, hexyl, decyl, chloromethyl, chloroethyl, cyclohexyl, methyl-cyclopentyl, propyl-cyclopentyl, amyl-cyclopentyl, methyl-cyclohexyl, dimethyl-cyclohexyl, phenyl, chlorophenyl, xenyl, naphthyl, tolyl, xylyl, ethyl-phenyl, propyl-phenyl, isopropyl-phenyl, benzyl, phenethyl, phenyl-propyl, phenyl-butyl, acetoxy-ethyl, chloro-phenoxy-ethyl, acetoxy-propyl, acetoxy-isopropyl, methoxy-propyl, ethoxy-propyl, etc.

The R group for most purposes of the present invention is advantageously an alkyl group of less than four carbon atoms and for reasons of economy and ease of preparation, the methyl monoester of itaconic acid is usually preferred. This monoester is prepared simply by refluxing methanol with itaconic acid in the presence of small amounts of an esterification catalyst such as sulfuric acid, toluene sulfonic acid, cation-exchange resins containing sulfonic acid groups, etc.

Although even smaller amounts are somewhat effective, the improvement in dye susceptibility of acrylonitrile copolymers becomes particularly noticeable when itaconic monoester is present in the copolymer at concentrations of 0.1 percent and the dye susceptibility increases as the amount of monoester in the copolymer is increased. However, even though amounts of itaconic monoester up to 5 percent can effect sufficient improvement in dye susceptibility, it may be advantageous for various reasons, such as in the preparation of polymers having intense coloring properties to have a major proportion of itaconic monoester in the copolymer.

The copolymers of this invention show great affinity toward many dyes, especially basic dyes and cellulose acetate dyes. Basic dyes containing amino groups, both substituted and unsubstituted, are particularly effective. It appears that the acid groups of the copolymers become attached to the amino groups of the dye molecules by chemical reaction or salt formation, thereby giving fast and more lasting properties to the dyed products.

In addition to the improvements effected in the resultant copolymers, the use of an itaconic monoester has certain other advantages over the use of itaconic acid. For example, the monoesters are more soluble in acrylonitrile and more insoluble in water than is itaconic acid. Thus, it is generally easier to get complete and uniform copolymerization of the monoester with acrylonitrile in emulsion and suspension polymerizations. Therefore, the acid numbers of the resultant copolymers more nearly approach the theoretical value than in the itaconic acid-acrylonitrile copolymers. This condition is emphasized even more when the ester group is large and more water-insoluble.

The primary effect of the dienes described herein in the acrylonitrile-itaconic monoester copolymers of this invention is to give to the copolymer the property of elastic recovery or snapback. Vulcanization or crosslinking contributes to this property but since crosslinking reduces solubility of the copolymer it is usually desirable to delay the vulcanization or crosslinking until after the copolymer is formed into a shaped article and possibly cold-drawn to give molecular orientation. To prevent or inhibit crosslinking during copolymerization, an alkyl mercaptan, such as dodecyl mercaptan, decyl mercaptan, etc., is added to the monomer mixture. At such time when crosslinking is desired, this is accomplished by the use of vulcanization agents, such as sulfur, in accordance with standard methods of vulcanizing natural or synthetic rubber with or without reinforcing agents such as carbon black, zinc silicate, calcium silicate, etc. This property of elastic recovery or snap-back is somewhat proportional to the amount of diene used in the copolymer, i. e., large amounts of diene give a greater propensity for elastic recovery or snap-back than do small amounts. However, with increasing amounts of diene, the copolymer's capacity for molecular orientation decreases and eventually disappears.

As accelerators in conjunction with sulfur, there may be used the aldehyde amines, the guanidines, the carbon disulfide derivatives or mixtures of such materials. Some typical examples are heptaldehyde-aniline, butyraldehyde butyl amine, diphenyl-guanidine, di-o-toluyl-guanidine, triphenyl-guanidine, zinc dimethyl dithiocarbamate, zinc dibutyl dithiocarbamate, tetramethyl thiuram disulfide, tetramethyl thiuram monosulfide, mercapto benzothiazole, zinc mercapto-benzothiazole, benzothiazole disulfide, etc.

These materials may also be vulcanized without sulfur by the use of nitrocompounds and organic peroxides such as trinitrobenzene, tetranitronaphthalene, benzoyl peroxide, a mixture of benzaldehyde and mercuric oxide, halogenated benzoquinones, benzoquinone dioxime, etc.

In many cases where films are molded products of the copolymers of this invention are to be used unvulcanized and are required to withstand prolonged aging, it is desirable to add a small amount of antioxidant to such compositions containing high amounts of acrylonitrile which are intended for use as unvulcanized thermoplastics. It is obvious that the compositions of this invention made with high quantities of dienes should likewise be compounded with antioxidants and inhibitors to give them strength before their use in producing vulvanized products. As suitable oxidation inhibitors may be mentioned N-phenyl beta-naphthyl amine, hydroquinone, eugenol, and similar substances, the amount needed being small, of the order of 0.1 to 2 percent of the weight of the copolymer.

As stated before, elasticity imparted to the copolymer is somewhat related to the proportion of diene present in the copolymer. The effects of crosslinking are noticeable when the diene is present in amounts of about 1 percent or more, whereas noticeable improvements in elasticity are effected in concentrations of about 2 percent or more of diene in the copolymer. With minor amounts of diene and high proportions of acrylonitrile or other monomers of strong secondary-valence bonding forces in the copolymer molecules, the copolymers are capable of molecular orientation. In the preparation of shaped articles which may be molecularly oriented it is generally desirable to have no more than 40 percent, advantageously no more than 20 percent butadiene-1,3, isoprene, 2,3-dimethyl-butadiene-1,3, 2-methyl-pentadiene-1,3, or 2,3-dimethyl-pentadiene-1,3 in the copolymer molecules.

The acrylonitrile copolymers discussed herein are, before crosslinking or vulcanization, soluble in N,N-dimethyl acetamide (DMA), N,N-dimethyl formamide (DMF), and a number of similar solvents, used alone or in conjunction with N,N-dimethyl cyanamide, N,N-dimethyl cyanoacetamide, N,N-dimethyl methoxy acetamide, methylene dinitrile, methylene di-thiocyanate, formyl caprolactam, formyl morpholine, tetramethylene sulfone, etc. Tetra-alkyl ureas of the formula $(CH_3)_2NC(O)NRR'$ can also be used as solvents, in which formula R and R' are methyl, ethyl, propyl, isopropyl, etc. Solvents of this latter type, such as N,N,N',N'-tetramethyl urea (TMU), are disclosed in the applicant's copending application, Serial Number 187,689, filed September 29, 1950. Nitroalkanes, such as nitromethane, may be used as solvents for such copolymers having no more than about 85 percent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength, such as vinyl chloride, may often be dissolved in acetone or mixtures of acetone and solvents of the above types.

This invention will be more fully described by the following examples which illustrate methods of practicing the invention. In these examples and throughout the specification, "parts" and "percentages" are intended to mean parts by weight and percentages by weight.

Example I

Five copolymers of acrylonitrile are prepared from the following monomer compositions:

| Acrylo-nitrile | 2-Methyl-Penta-diene-1,3 | Mono-methyl Itaconate | Copolymer Soluble In |
|---|---|---|---|
| Parts | Parts | Parts | |
| 98 | 2 | -------- | DMA, DMF, TMU, etc. |
| 97.9 | 2 | 0.1 | DMA, DMF, TMU, etc. |
| 93 | 2 | 5 | DMA, DMF, TMU, etc. |
| 88 | 2 | 10 | DMA, DMF, TMU, etc. |
| 78 | 2 | 20 | DMA, DMF, TMU, etc. |

The 100 parts of monomer mixture containing 0.5 part of dodecyl mercaptan is, in each case, slowly added over a period of less than an hour to 750–1000 parts of distilled water at 30–50° C. containing dissolved therein 0.6 to 1 part of ammonium persulfate, 0.6 to 1.5 parts of sodium bisulfite, and 0.5 part of sodium dodecylbenzene sulfonate. The reaction is continued for 1–3 hours, at which time a yield of about 90 percent solid polymer is precipitated. The resulting polymers have molecular weights over 10,000 and acid numbers approximately theoretical. Each polymer is dissolved in N,N-dimethyl acetamide or N,N,N',N'-tetramethyl urea and a film cast from each solution.

A solution of methylene blue dye (a basic dye) is prepared by making a paste of the dye with 1 percent by weight dye solution. This dye solution is kept boiling for one hour while the aforementioned films are immersed therein for one hour. The dyed films are then removed and separately subjected to washing with boiling water for one hour, the boiling water being changed frequently to remove the desorbed dye. The copolymer containing no itaconic monoester shows only a light tint, whereas the monomethyl itaconate copolymers are a deep and dense shade. Identical films, cold-drawn and heat-treated, show dyeing characteristics similar to the undrawn films.

Fibers are spun from the same N,N-dimethyl acetamide or N,N,N',N'-tetramethyl urea solutions either by dry spinning, or by wet spinning into a precipitating bath, such as glycerine, diglycerine, diethylene glycol, etc. The fibers are substantially freed from solvent and dried. After cold-drawing the dried fibers between 200 and 800 percent at 100–145° C. and subsequently heat-treating them at 100–150° C. for one hour, the fibers are given the same dyeing and washing treatment described above with the same results as for the films, a light tint being acquired by the itaconate-free copolymer fibers and a deep and dense color being given to the monomethyl itaconate copolymer fibers, the intensity of shade increasing with the amount of itaconic acid ester.

Instead of the monomethyl itaconate ester of the above example, various other monoesters of itaconic acid may be used, such as the ethyl, propyl, isopropyl, butyl, isobutyl, tertiarybutyl, hexyl, tolyl, phenyl, naphthyl, cyclopentyl, cyclohexyl, benzyl, phenethyl monoesters of itaconic acid.

Example II

The following ingredients were reacted for 24 hours at 30° to 40° C., in a jacketed reactor equipped with stirrer.

| | Parts |
|---|---|
| Dioctyl ester of sodium sulfosuccinic acid | 25 |
| Distilled water | 500 |
| Acrylonitrile | 60 |
| Butadiene-1,3 | 20 |
| Vinyl butyl ether | 19 |
| Monomethyl itaconate | 1 |
| Potassium persulfate | 0.5 |
| Decyl mercaptan | 2 |

After the addition of 0.5 part of N-phenyl beta-naphthyl amine, the emulsion was precipitated using a 3% hydrochloric acid solution saturated with sodium chloride. The precipitate was washed in boiling water to remove chlorides and then dried in a vacuum oven under 24 inches of mercury at 50° C. An excellent yield of a tough, flexible, vulcanizable copolymer having good dye susceptibility was obtained.

Example III

Vulcanized products of high utility are obtained by processing the copolymer of the preceding example using the following as the ratio of components:

| | Parts |
|---|---|
| Copolymer | 100 |
| Zinc silicate | 25 |
| Benzothiazyl disulfide | 2 |
| Sulfur | 2 |
| Stearic acid | 1 |

These compounds when cured at 130° C. for 30 minutes give compositions of increased heat and solvent resistance and may be as readily dyed as the itaconate copolymers of Example I. The compounding can be accomplished using standard milling procedures, or by the addition of the ingredients to a solution of the polymer. When such solutions are used films, fibers, etc., may be readily prepared therefrom.

Example IV

The procedure of Example II is repeated for the polymerization of the following monomer compositions:

| Acrylonitrile | Styrene | Isoprene | Monomethyl Itaconate | Copolymer Soluble In |
|---|---|---|---|---|
| Pt. | Pt. | Pt. | Pt. | |
| 89.5 | 5 | 5 | 0.5 | DMF, DMA, TMU, etc. |
| 79.5 | 15 | 5 | 0.5 | NO₂Me. |
| 69.5 | 25 | 5 | 0.5 | Do. |
| 59.5 | 35 | 5 | 0.5 | Acetone. |

Dyeing tests of these copolymers show improvements in dye susceptibility similar to the itaconate copolymers of Example I. These copolymers dissolve in N,N-dimethyl acetamide, N,N,N',N'-tetramethyl urea, etc. When such solutions, to which a vulcanizing agent has been added, are dry spun, or wet spun into a glycerine or other precipitating bath, fibers, films, etc., are obtained which may be cold-drawn to give molecular orientation before complete crosslinking is effected and then heat-treated at 130° C. until vulcanization is complete to give shaped articles of increased heat and solvent resistance, good elastic recovery, and good dye susceptibility.

In place of styrene, various styrene derivatives may be used, such as alpha-methyl-styrene; nuclear-substituted chloro-styrenes, i. e., ortho-, meta-, and para-chloro-styrenes, dichloro-styrenes, for example the 2,3-, 2,4-, 2,5-, 2,6-, 3,4-, and 3,5-dichloro-styrenes, trichloro-styrenes; cyano-styrenes, such as ortho-, meta- and para-cyano-styrenes, dicyano-styrenes; nuclear- substituted alkyl-styrenes, such as mono- and di-methyl-styrenes, mono- and di-ethyl-styrenes, mono- and di-isopropyl-styrenes; aryl-substituted styrenes, i. e., para-phenyl-styrene, etc.; cyclo-aliphatic-substituted styrenes, such as para-cyclohexyl-styrene; fluoro-styrenes, such as ortho-, meta-, para-fluoro styrenes, di-fluoro-styrenes, etc.; trifluoromethyl-styrenes, such as ortho-, meta-, and para-trifluoromethyl-styrenes, di-(trifluoromethyl)-styrenes; and various other styrenes or mixtures of any number of these with each other or with styrene.

*Example V*

The procedure of Example II is repeated for the polymerization of the following monomer compositions:

| Acrylo-nitrile | Methacrylo-nitrile | Butadiene-1,3 | Monomethyl Itaconate | Copolymer Soluble In |
|---|---|---|---|---|
| Pt. 90 | Pt. 5 | Pt. 3 | Pt. 2 | DMF, DMA, TMU, etc. |
| 85 | 10 | 3 | 2 | Do. |
| 75 | 20 | 3 | 2 | Do. |

With the above methacrylonitrile copolymers and similar copolymers having a total of acrylonitrile and methacrylonitrile of at least about 85 percent in the polymer molecules, only the more active solvents, such as N,N-dimethyl acetamide, N,N-dimethyl formamide, N,N,N',N'-tetramethyl urea, etc., can be used as solvents. The above copolymers dye more readily and thoroughly than similar copolymers containing no itaconic monoester, and upon vulcanization have improved heat and solvent resistance.

*Example VI*

| Acrylo-nitrile | meta-Cyano-Styrene | beta-Cyanoethyl Vinyl Ether | Butadiene-1,3 | Monomethyl Itaconate | Copolymer Soluble In |
|---|---|---|---|---|---|
| Pt. 80 | Pt. 5 | Pt. 8 | Pt. 5 | Pt. 2 | DMA, TMU, etc. |
| 70 | 15 | 8 | 5 | 2 | Do. |
| 70 | 10 | 13 | 5 | 2 | NO₂Me, etc. |
| 50 | 15 | 28 | 5 | 2 | Do. |

Copolymer products prepared from the above monomer compositions according to the procedure of Example II dye more readily and thoroughly than similar copolymers containing no itaconic monoester, and upon vulcanization have improved heat and solvent resistance.

The copolymers of the present invention have a plurality of repeating units of the formulas

—CH₂—CH—
      |
      CN

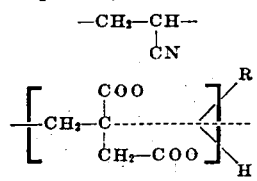

and

where R is an alkyl, aryl, alkylaryl, aralkyl, cycloaliphatic group or a halogen-, acyloxy-, or alkoxy derivative thereof, preferably an alkyl group of less than four carbon atoms, and R' is a radical of the class consisting of hydrogen and methyl radicals. In addition, the copolymers may contain any number of repeating units of the type obtained by the copolymerization of acrylonitrile, an itaconic monoester and a diene of the above formulas with one or more copolymerizable ethylenic compounds, such as, for example, styrene, alpha-methyl-styrene, methacrylonitrile, nuclear-substituted mono-cyano-styrene, beta-cyanoethyl vinyl ether, fumaronitrile, beta-cyano-acrylamide and methyl beta-cyano-acrylate. Usually the effects of the presence of these latter copolymerizable ethylenic compounds in the polymer molecule is noticeable for amounts of 1 percent or more.

As previously indicated, the solvent resistance of such copolymers as contain one or more monomer units in addition to those formed by the acrylonitrile, the itaconic monoester and the diene is affected by the type and proportion of copolymerizing monomer or monomers used to replace part of the acrylonitrile. For example, copolymers containing minor amounts of itaconic monoester and diene units may contain various proportions of such monomer units as obtained from methacrylonitrile, fumaronitrile, and beta-cyano-acrylamide without considerable reduction in solvent resistance. Replacement of acrylonitrile units in the copolymers by vinyl chloride and styrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example, the tensile strength of an acrylonitrile-itaconic monoester-diene copolymer will be decreased much more when a monomer is used which has relatively weak secondary-valence bonding forces, such as ethylene or styrene, than will be the case when a monomer having relatively strong secondary-valence bonding forces, such as methacrylonitrile, fumaronitrile, beta - cyano - acrylamide, and methyl beta-cyano-acrylate, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds which may also be present in the polymerizable masses for copolymerization with acrylonitrile, diene and itaconic monoester include one or more of the following: acrylates, e. g. methyl acrylate; methacrylates, e. g. methyl methacrylate; acrylamides; methacrylamides; vinyl esters, such as vinyl acetate; vinylidene chloride; vinyl chloride; maleates, such as dimethyl and diethyl maleates; fumarates, such as dimethyl and diethyl fumarates; itaconic diesters, such as dimethyl and diethyl itaconates; itaconamide; vinyl halides, such as vinyl fluoride; vinylidene fluoride; tetrafluoroethylene; trifluororchloroethylene; vinyl aryls, such as vinyl naphthalenes and substituted styrenes as listed in Example IV; etc.

The copolymers of this invention may be prepared by various polymerization systems, such as emulsion, suspension, mass and solution polymerizations. In addition to the monomers, the polymerizable mass may also contain other materials such as catalysts, e. g. peroxides, such as benzoyl peroxide, naphthyl peroxides, phthalyl peroxide, tertiary-butyl hydroperoxide, hydrogen peroxide, cyclohexyl hydroperoxide, tertiary-butyl perbenzoate, etc., persulfates, such as ammonium persulfate, etc., solvents, suspension or emulsion media, emulsifying agents, suspension agents, plasticizers, lubricants, etc.

For use in the preparation of shaped articles, the copolymers of this invention have molecular weights preferably of at least about 10,000. However, copolymers of molecular weights less than 10,000 may be used for other purposes, such as impregnants, solvent resistant coatings, etc. The molecular weight of the copolymers is dependent on the concentrations of the monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having a very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Useful fibers may be made from the solutions of the copolymers of this invention by dry spinning, as in the preparation of viscose rayon. In wet spinning, the solution of copolymer may be spun into a substance which is a non-solvent for the copolymers, but which is advantageously compatible with the solvent in which the copolymer is dissolved. For example, water, acetone, methyl alcohol, carbon disulfide, glycerine, chloroform, carbon tetrachloride, benzene, etc., may be used as precipitating bath for N,N-dimethyl acetamide, N,N,N',N'-tetramethyl urea, and other solvent compositions of these copolymers. The extruded fibers, from which substantially all of the solvent has been removed in the spinning step, about 1-10 percent remaining in the shaped article, may then be cold-drawn about 100-600 percent, preferably about 300-600 percent and the drawn fiber heat-treated, usually at substantially constant length, at about 100-160° C. to effect further crystallization and removal of the remaining solvent. The term "heat-treated," as used herein, refers to the application of heat to an object, usually at a controlled temperature and usually by means of the medium surrounding the object.

Many of the acrylonitrile copolymers of this invention may be molecularly oriented. This is true when the major portion of the copolymer is acrylonitrile, for example 85 percent or more acrylonitrile, or when the other copolymerizing monomers used in making such copolymers have substituent groups having secondary-valence bonding forces approximately equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with the acrylonitrile, itaconic monester and diene, the proportion of acrylonitrile in the copolymer may be much less than 85 percent without destroying the capacity for molecular orientation. Molecularly oriented, cold-drawn, shaped articles of particular usefulness are prepared from copolymer compositions containing in the polymer molecules about 60–97.9 percent by weight acrylonitrile, about 0.1–5 percent by weight monomethyl itaconate, and about 2–39.9 percent by weight of a diene of the formula described above, with or without one or more monomers of the class consisting of styrene, alpha-methyl-styrene, methacrylonitrile, fumaronitrile, beta-cyano-acrylamide, methyl beta-cyano-acrylate, nuclear-substituted monocyano-styrene, and beta-cyanoethyl vinyl ether, the effect of the presence in the copolymer molecule of a monomer of this class being noticeable for amounts of 1 percent or more.

The basic dyestuffs toward which these copolymers show great affinity are preferably those which contain amido, alkylamido or ammonium groups, such as —NH₂, —N(CH₃)₂, —N(C₂H₅)₂, —NHC₆H₅, —N(CH₃)₃OH, etc. and which may also be used in the form of their salts, i. e. the hydrochlorides, sulfates or oxalates. Some of these basic dyes are Methylene Blue, Rhodamine B, Indamine Blue, Auramine, Meldola's Blue, Chrysoidine Y, Acridine Yellow, Magenta, Crystal Violet, Thioflavine T, Safranine and Bismarck Brown. The cellulose acetate dyes which are effective with these copolymers are mainly amino-anthraquinone derivatives, basic azo compounds and other basic substances, such as the Duranol, Dispersol, Sericol, etc. dyestuffs.

From the molecularly orientable copolymers of this invention fibers may be prepared having improved dyeing properties, low shrinkage in boiling water, sometimes as low as 3 to 5 percent or less of the cold-drawn or stretched article, good heat-resistance, tensile strength as high as 4–6 grams per denier, and improved elasticity. Moreover, these properties make the fibers desirable in the manufacture of hosiery and for such all-purpose fabrics as used for blouses, shirts, suits, etc., and, when the proper amount of elasticity is incorporated, for girdles, etc.

What is claimed is:

1. A copolymer having a plurality of repeating units having the formulas

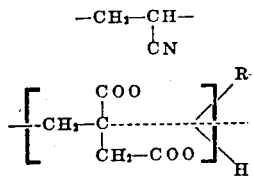

and $$-CH_2-C(R')=C(R')-CH(R')-$$

wherein R is an alkyl group of less than four carbon atoms and may be attached to either acid group, and R' is a radical of the class consisting of hydrogen and methyl radicals, said copolymer containing about 60-97.9 percent by weight of units having the first formula, about 0.1-5 percent by weight of units having the second formula, and about 2-39.9 percent by weight of units having the third formula.

2. A composition of matter comprising the polymerization product of a polymerizable mass comprising acrylonitrile, a monoalkyl ester of itaconic acid, in which ester the alkyl group has less than four carbon atoms, and a diene having the formula $$CH_2=C(R')-C(R')=CH(R')$$

wherein R' is a radical selected from the class consisting of hydrogen and methyl radicals, said polymerization product containing in the polymer molecule about 60-97.9 percent by weight acrylonitrile, about 0.1-5 percent by weight said ester and about 2-39.9 percent by weight said diene.

3. A composition of matter of claim 2, in which the diene is butadiene-1,3.

4. A composition of matter of claim 2, in which the monoalkyl ester is monomethyl itaconate.

5. A composition of matter of claim 2, in which the diene is butadiene-1,3 and the monoalkyl ester is monomethyl itaconate.

6. A composition of matter comprising the polymerization product of a polymerizable mass comprising acrylonitrile, a monoalkyl ester of itaconic acid, in which ester the alkyl group has less than four carbon atoms, a diene having the formula $$CH_2=C(R')-C(R')=CH(R')$$

wherein R' is a radical selected from the class consisting of hydrogen and methyl radicals, and at least one member of the class consisting of alpha-methyl-styrene, fumaronitrile, beta-cyano-acrylamide, methyl beta-cyano-acrylate, nuclear-substituted mono-cyano-styrene, and beta-cyanoethyl vinyl ether, said polymerization product containing in the polymer molecule about 60-96.9 percent by weight acrylonitrile, about 0.1-5 percent by weight of said ester, about 2-38.9 percent by weight of said diene and a total of about 1-37.9 percent by weight of at least one member of said class.

7. A composition of matter of claim 6, in which the diene is butadiene-1,3.

8. A composition of matter of claim 6, in which the diene is 2-methyl-pentadiene-1,3.

9. A shaped article comprising between about 1% and about 10% N,N,N',N'-tetramethyl urea, and a copolymer of acrylonitrile, monomethyl itaconate and a diene of the formula $$CH_2=C(R')-C(R')=CH(R')$$

wherein R' is a radical of the class consisting of hydrogen and methyl radicals, said copolymer having a molecular weight of at least about 10,000, said copolymer containing in the polymer molecule about 60-97.9 percent by weight arcylonitrile, about 0.1-5 percent by weight monomethyl itaconate, and about 2-39.9 percent by weight said diene.

10. A shaped article of claim 9, in which the diene is butadiene-1,3.

11. A shaped article comprising the polymerization product of a polymerizable mass comprising acrylonitrile, a monoalkyl ester of itaconic acid, said alkyl group having less than four carbon atoms, and a diene of the formula $$CH_2=C(R')-C(R')=CH(R')$$

wherein R' is a radical of the class consisting of hydrogen and methyl radicals, said copolymer having a molecular weight of at least about 10,000 said polymerization product containing in the polymer molecule about 60-97.9 percent by weight acrylonitrile, about 0.1-5 percent by weight said ester and about 2-39.9 percent by weight said diene.

12. A shaped article of claim 11, in which the monoalkyl ester is monomethyl itaconate.

13. A shaped article of claim 11, in which the diene is butadiene-1,3.

14. A shaped article of claim 11, in which the diene is isoprene.

15. A cold-drawn shaped article having molecular orientation, said article comprising a copolymer containing in the polymer molecule about 60-97.9 percent by weight acrylonitrile, about 0.1-5 percent by weight monomethyl itaconate, and about 2-39.9 percent by weight of a diene of the formula $$CH_2=C(R')-C(R')=CH(R')$$

wherein R' is a radical of the class consisting of hydrogen and methyl radicals, said copolymer having a molecular weight of at least about 10,000.

16. A cold-drawn shaped article of claim 15, in which the diene is butadiene-1,3.

17. A cold-drawn shaped article having molecular orientation, said article comprising a copolymer containing in the polymer molecule about 60-96.9 per cent by weight acrylonitrile, about 0.1-5 percent by weight monomethyl itaconate, about 1-37.9 percent by weight of at least one member of the class consisting of styrene, alpha-methyl-styrene, methacrylonitrile, fumaronitrile, beta-cyano-acrylamide, methyl beta-cyano-acrylate, a nuclear-substituted cyanostyrene and beta-cyanoethyl vinyl ether, and about 2-38.9 percent by weight of a diene of the formula $$CH_2=C(R')-C(R')=CH(R')$$

wherein R' is a radical of the class consisting of hydrogen and methyl radicals, said copolymer having a molecular weight of at least about 10,000.

18. A cold-drawn shaped article having molecular orientation, said article comprising a copolymer containing in the polymer molecule about 60-96 9 percent by weight acrylonitrile, about 0.1-5 percent by weight monomethyl itaconate, about 1-37.9 percent by weight of a nuclear-substituted cyano-styrene, and about 2-38.9 percent by weight of a diene of the formula $$CH_2=C(R')-C(R')=CH(R')$$

wherein R' is a radical of the class consisting of hydrogen and methyl radicals, said copolymer having a molecular weight of at least about 10,000.

19. A cold-drawn shaped article having molecular orientation, said article comprising a copolymer containing in the polymer molecule about 60–96.9 percent by weight acrylonitrile, about 0.1–5 percent by weight monomethyl itaconate, about 1–37.9 percent by weight beta-cyanoethyl vinyl ether, and about 2–38.9 percent by weight of a diene of the formula $$CH_2=C(R')-C(R')=CH(R')$$

wherein R' is a radical of the class consisting of hydrogen and methyl radicals, said copolymer having a molecular weight of at least about 10,000.

20. A cold-drawn shaped article having molecular orientation, said article comprising a copolymer containing in the polymer molecule about 60–96.9 percent by weight acrylonitrile, about 0.1–5 percent by weight monomethyl itaconate, about 1–37.9 percent by weight styrene, and about 2–38.9 percent by weight of a diene of the formula $$CH_2=C(R')-C(R')=CH(R')$$

wherein R' is a radical of the class consisting of hydrogen and methyl radicals, said copolymer having a molecular weight of at least about 10,000.

21. A cold-drawn fiber having molecular orientation, said fiber comprising a copolymer containing in the polymer molecule about 60–96.9 percent by weight acrylonitrile, about 0.1–5 percent by weight monomethyl itaconate, and about 2–39.9 percent by weight of a diene of the formula $$CH_2=C(R')-C(R')=CH(R')$$

wherein R' is a radical of the class consisting of hydrogen and methyl radicals, said copolymer having a molecular weight of at least about 10,000.

22. A composition of matter of claim 2, which composition also contains a basic dye having amino groups therein.

GAETANO F. D'ALELIO.

REFERENCES CITED

The following references are of record in the file of this patent:

UNITED STATES PATENTS

| Number | Name | Date |
|---|---|---|
| 2,047,398 | Voss et al. | July 14, 1936 |
| 2,458,352 | D'Alelio | Jan. 4, 1949 |
| 2,460,578 | Houtz | Feb. 1, 1949 |